United States Patent
Ozaki et al.

[19]

[11] Patent Number: 5,809,545
[45] Date of Patent: Sep. 15, 1998

[54] OPTICAL DISC FOR A MASTER KEY, AND A METHOD AND APPARATUS FOR OPTICAL-DISC INFORMATION MANAGEMENT WHICH INHIBIT AND PERMIT REPRODUCTION OF MAIN INFORMATION FROM AN ILLEGAL COPY DISC BY USING PHYSICAL AND LOGICAL SECURITY INFORMATION

[75] Inventors: Kazuhisa Ozaki, Yokosuka; Kanji Kayanuma, Hadano, both of Japan

[73] Assignee: Victor Company of Japan, Ltd., Yokohama, Japan

[21] Appl. No.: 527,004

[22] Filed: Sep. 12, 1995

[30] Foreign Application Priority Data

Sep. 30, 1994 [JP] Japan .................................. 6-261506

[51] Int. Cl.[6] .............................. G06F 12/14; H04L 9/00
[52] U.S. Cl. ........................ 711/164; 711/162; 395/186; 395/188.01; 380/3; 380/4; 235/380; 360/60
[58] Field of Search ........................ 380/3, 4; 395/186, 395/188.01; 235/380; 711/162, 164; 360/60

[56] References Cited

U.S. PATENT DOCUMENTS

| 4,577,289 | 3/1986 | Comerford et al. ................ 360/60 |
| 4,584,641 | 4/1986 | Guglielmino ...................... 380/4 |
| 4,740,890 | 4/1988 | William ........................... 395/186 |
| 5,027,396 | 6/1991 | Platteter et al. .................. 380/4 |
| 5,163,096 | 11/1992 | Clark et al. ...................... 395/491 |
| 5,191,611 | 3/1993 | Lang ............................. 380/25 |
| 5,222,133 | 6/1993 | Chou et al. ....................... 380/4 |
| 5,319,705 | 6/1994 | Halter et al. ..................... 380/4 |
| 5,363,446 | 11/1994 | Ruppertz et al. .................. 380/4 |
| 5,371,792 | 12/1994 | Asai et al. ....................... 380/3 |
| 5,375,243 | 12/1994 | Parzych et al. .................. 395/188.01 |
| 5,379,433 | 1/1995 | Yamagishi ....................... 395/186 |
| 5,473,584 | 12/1995 | Oshima .......................... 369/32 |
| 5,475,762 | 12/1995 | Morisawa et al. ................ 380/25 |
| 5,513,260 | 4/1996 | Ryan ............................. 380/3 |

FOREIGN PATENT DOCUMENTS

| 0545472 | 6/1993 | European Pat. Off. . |
| 0565281 | 10/1993 | European Pat. Off. . |
| 3828573 | 3/1990 | Germany . |
| 4308680 | 10/1993 | Germany . |
| 61-178732 | 8/1986 | Japan . |
| 61-296433 | 12/1986 | Japan . |
| 63-292458 | 11/1988 | Japan . |
| 3-14771 | 2/1991 | Japan . |

*Primary Examiner*—Eddie P. Chan
*Assistant Examiner*—Hong C. Kim
*Attorney, Agent, or Firm*—Lowe, Price, LeBlanc & Becker

[57] ABSTRACT

An optical disc for a key physically stores first security information. The optical disc logically stores second security information. The first security information is equal to security information physically recorded on a legitimate optical disc. The second security information is equal to security information logically recorded on the legitimate optical disc.

17 Claims, 4 Drawing Sheets

FIG. 1
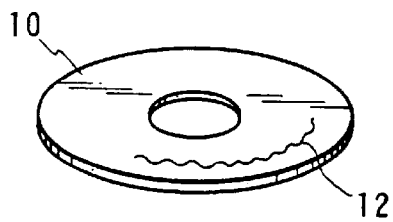
FIG. 2
| DISC ID | MAKER ID | MAIN INFORMATION |
|---|---|---|
| 「GAME」 | 「A」 | |
FIG. 3
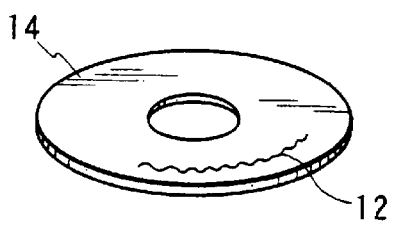
FIG. 4
| DISC ID | MAKER ID | |
|---|---|---|
| 「KEY」 | 「A」 | |
FIG. 5
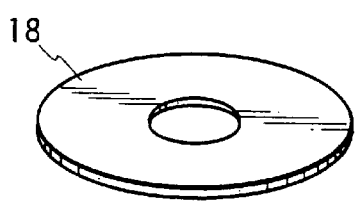
FIG. 6
| DISC ID | MAKER ID | MAIN INFORMATION |
|---|---|---|
| 「GAME」 | 「A」 | |
FIG. 7
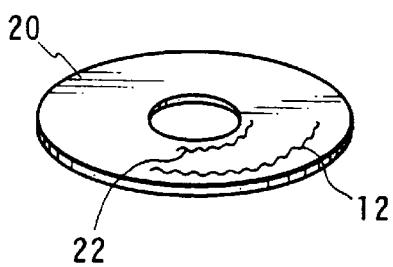
FIG. 8
| DISC ID | MAKER ID | |
|---|---|---|
| 「KEY」 | 「M」 | |

OPTICAL DISC FOR A MASTER KEY, AND A METHOD AND APPARATUS FOR OPTICAL-DISC INFORMATION MANAGEMENT WHICH INHIBIT AND PERMIT REPRODUCTION OF MAIN INFORMATION FROM AN ILLEGAL COPY DISC BY USING PHYSICAL AND LOGICAL SECURITY INFORMATION

BACKGROUND OF THE INVENTION

1. Field of the Invention

This invention relates to an optical disc provided with copy protection. In addition, this invention relates to information management method and apparatus for copy protection with respect to an optical disc.

2. Description of the Prior Art

Japanese published unexamined patent application (Kokai) 61-178732 discloses an apparatus for preventing the illegally copying of a legitimate optical disc. In Japanese application 61-178732, a legitimate optical disc has dummy pits and true pits. Each dummy pit is different from each true pit in reflection area. The legitimate optical disc stores data of the positions of the dummy pits. On the other hand, an illegal copy disc generally lacks dummy pits. In Japanese application 61-178732, during the reproduction of information from an optical disc, the output signal of an optical pickup device is changed from a normal form when the absence of dummy pits from their normal positions is detected so that the optical disc is judged to be illegal. The change of the output signal of the optical pickup device from its normal form makes it difficult to properly recover the information on the optical disc.

Japanese published unexamined utility model application (Kokai) 3-14771 discloses an information recording medium with a copy protection format. The information recording medium in Japanese application 3-14771 has a normally formatted area and a second area outside the normally formatted area. The second area stores check information (copy protection information). The check information in the second area can not be copied by a copying program. Accordingly, a copy-resultant medium lacks the check information. In Japanese application 3-14771, an information recording medium lacking the check information is judged to be illegal.

Japanese published unexamined patent application (Kokai) 63-292458 discloses a copy protection apparatus in which a first inhibition code is extracted from an information signal currently recorded on a magnetic tape. Simultaneously, a second inhibition code is reproduced from the magnetic tape. In the apparatus of Japanese application 63-292458, the first inhibition code and the second inhibition code are compared with each other. When the first inhibition code and the second inhibition code are different from each other, the recording of the information signal on the magnetic tape is interrupted. When the first inhibition code and the second inhibition code agree with each other, the recording of the information signal on the magnetic tape is maintained.

Japanese published unexamined patent application (KoKai) 61-296433 discloses a software management system for an external storage unit (a ROM cartridge). In the system of Japanese application 61-296433, an IC for locking a game machine body compares a result generated by itself with an operated result inputted from a key IC in a ROM cartridge. When the two results are different from each other, the reset status of circuits in the body is held and the execution of a game program is inhibited. When the two results coincide with each other, the reset status of the circuits in the body is released or removed.

SUMMARY OF THE INVENTION

It is a first object of this invention to provide an improved optical disc.

It is a second object of this invention to provide an improved method of optical disc information management.

It is a third object of this invention to provide an improved apparatus for optical disc information management.

A first aspect of this invention provides an optical disc for a key which physically stores first security information and which logically stores second security information, the first security information being equal to security information physically recorded on a legitimate optical disc, the second security information being equal to security information logically recorded on the legitimate optical disc.

A second aspect of this invention provides a method of information management which comprises the steps of a) detecting security information logically recorded on a key optical disc; b) storing the security information detected by the step a); c) detecting security information logically recorded on a second optical disc to be checked; d) deciding whether or not the security information stored by the step b) and the security information detected by the step c) agree with each other; e) permitting reproduction of other information from the second optical disc when the security information stored by the step b) and the security information detected by the step c) agree with each other; and f) inhibiting reproduction of other information from the second optical disc when the security information stored by the step b) and the security information detected by the step c) do not agree with each other.

A third aspect of this invention provides an optical disc for a master key which physically stores first security information and second security information, and which logically stores third security information, the first security information being equal to security information physically recorded on a legitimate optical disc.

A fourth aspect of this invention provides a method of information management which comprises the steps of a) detecting security information logically recorded on a master key optical disc; b) storing the security information detected by the step a); and c) permitting reproduction of information from a second optical disc to be checked after the security information is stored by the step b).

A fifth aspect of this invention provides an apparatus for information management which comprises first means for detecting security information logically recorded on a key optical disc; second means for storing the security information detected by the first means; third means for detecting security information logically recorded on a second optical disc to be checked; fourth means for deciding whether or not the security information stored by the second means and the security information detected by the third means agree with each other; fifth means for permitting reproduction of other information from the second optical disc when the fourth means decides that the security information stored by the second means and the security information detected by the third means agree with each other; and sixth means for inhibiting reproduction of other information from the second optical disc when the fourth means decides that the security information stored by the second means and the security information detected by the third means do not agree with each other.

A sixth aspect of this invention provides an apparatus for information management which comprises first means for detecting security information logically recorded on a master key optical disc; second means for storing the security information detected by the first means; and third means for permitting reproduction of information from a second optical disc to be checked after the security information is stored by the second means.

BRIEF DESCRIPTION OF THE DRAWINGS

FIG. 1 is a perspective diagram of an optical disc according to an embodiment of this invention.

FIG. 2 is a diagram of a logical data structure in the optical disc of FIG. 1.

FIG. 3 is a perspective diagram of a key disc according to the embodiment of this invention.

FIG. 4 is a diagram of a logical data structure in the key disc of FIG. 3.

FIG. 5 is a perspective diagram of a copy disc.

FIG. 6 is a diagram of a logical data structure in the copy disc of FIG. 5.

FIG. 7 is a perspective diagram of a master key disc according to the embodiment of this invention.

FIG. 8 is a diagram of a logical data structure in the master key disc of FIG. 7.

DESCRIPTION OF THE PREFERRED EMBODIMENT

Figure 9:
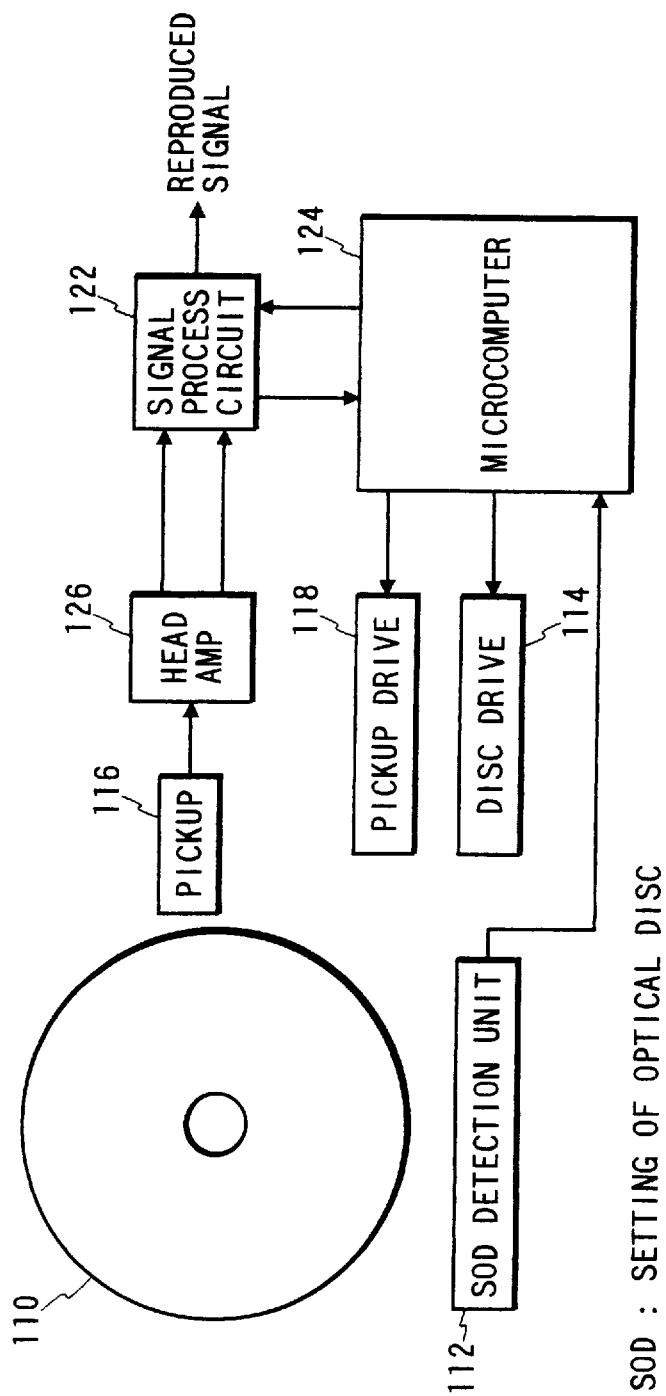
FIG. 9 is a block diagram of a part of an optical disc player according to the embodiment of this invention.

FIG. 1 shows an optical disc 10 designed as a legitimate end product commercially available for an end user. A predetermined area "1" or a read-out portion of the optical disc 10 is provided with a wobbling pit train 12 corresponding to physical security information.

The optical disc 10 of FIG. 1 has a logical structure of record data which is designed as shown in FIG. 2. Information represented by the record data on the optical disc 10 contains main information, disc ID (identification) information, and maker ID information. The main information represents, for example, a game program. The disc ID information indicates the type of the optical disc 10. The disc ID information denotes "GAME" when the main information represents the game program. The maker ID information indicates the maker of the optical disc 10, for example, the maker "A". The maker ID information constitutes logical security information.

FIG. 3 shows an optical disc 14 designed as a key for managing an illegal copy disc. A predetermined area "1" or a read-out portion of the key disc 14 is provided with a wobbling pit train 12 corresponding to physical security information.

The key disc 14 of FIG. 3 has a logical structure of record data which is designed as shown in FIG. 4. Information represented by the record data on the key disc 14 contains disc ID information and maker ID information. The disc ID information indicates the type of the key disc 14, that is, "KEY". The maker ID information indicates the maker of the key disc 14, for example, the maker "A". As will be described later, the key disc 14 is used to cancel copy protection. In general, it is unnecessary to store main information on the key disc 14.

FIG. 5 shows a Compact Disc of the write once type (a CD-WO) 18 which results from the copying of the legitimate optical disc 10 by a WO drive available for an end user.

The copy disc 18 of FIG. 5 has a logical structure of record data which is in a state as shown in FIG. 6. Information represented by the record data on the copy disc 18 contains main information, disc ID information, and maker ID information equal to those in the legitimate optical disc 10. Since the WO drive is incapable of wobbling a pit sequence, the copy disc 18 lacks a wobbling pit train corresponding to the wobbling pit train 12 on the legitimate optical disc 10.

FIG. 7 shows an optical disc 20 designed as a master key superior to the key provided by the key disc 14. A predetermined area "1" or a read-out portion of the master key disc 20 is provided with a wobbling pit train 12 corresponding to first physical security information. A predetermined area "2" or a read-in portion of the master key disc 20 is provided with a wobbling pit train 22 corresponding to second physical security information.

The master key disc 20 of FIG. 7 has a logical structure of record data which is designed as shown in FIG. 8. Information represented by the record data on the master key disc 20 contains disc ID information and maker ID information. The disc ID information indicates the type of the master key disc 20, that is, "KEY". The maker ID information indicates the maker of the master key disc 20, for example, the maker "M" superior to the maker "A". As will be described later, the master key disc 20 is used to cancel copy protection. In general, it is unnecessary to store main information on the master key disc 20.

FIG. 9 shows an example of a part of an optical disc player constituting an optical disc checking device. With reference to FIG. 9, the optical disc player includes a setting-of-optical-disc (SOD) detection unit 112 which serves to detect whether or not an optical disc 110 is set in position within the player. The optical disc 110 can be driven under control by a disc drive portion 114. An optical pickup head 116 reads out information from the optical disc 110 by using laser light beams. The optical pickup head 116 can be driven under control by a pickup drive portion 118. The optical pickup head 116 outputs electric signals representing the readout information and tracking-error information.

The optical pickup head 116 is successively followed by a head amplifier 120 and a signal processing circuit 122. The output signals of the optical pickup head 116 are amplified by the head amplifier 120 before being fed to and processed by the signal processing circuit 122. The signal processing circuit 122 generates and outputs a reproduced signal in response to the readout-information-representing signal fed via the head amplifier 120.

A microcomputer 124 is connected to the SOD detection unit 112, the disc drive portion 114, the pickup drive portion 118, and the signal processing circuit 122. The microcomputer 124 receives the output signal of the SOD detection unit 112. The microcomputer 124 receives the tracking-error information from the signal processing circuit 122. The microcomputer 124 outputs control signals to the disc drive portion 114, the pickup drive portion 118, and the signal processing circuit 122.

When a wobbling pit train 12 or 22 on an optical disc is scanned by the optical pickup head 116, a detected tracking error greatly varies around the null level. The microcomputer 124 detects such a variation in the tracking error, and recognizes the presence of the wobbling pit train 12 or 22 on the optical disc in response to the detected variation.

Figure 10:
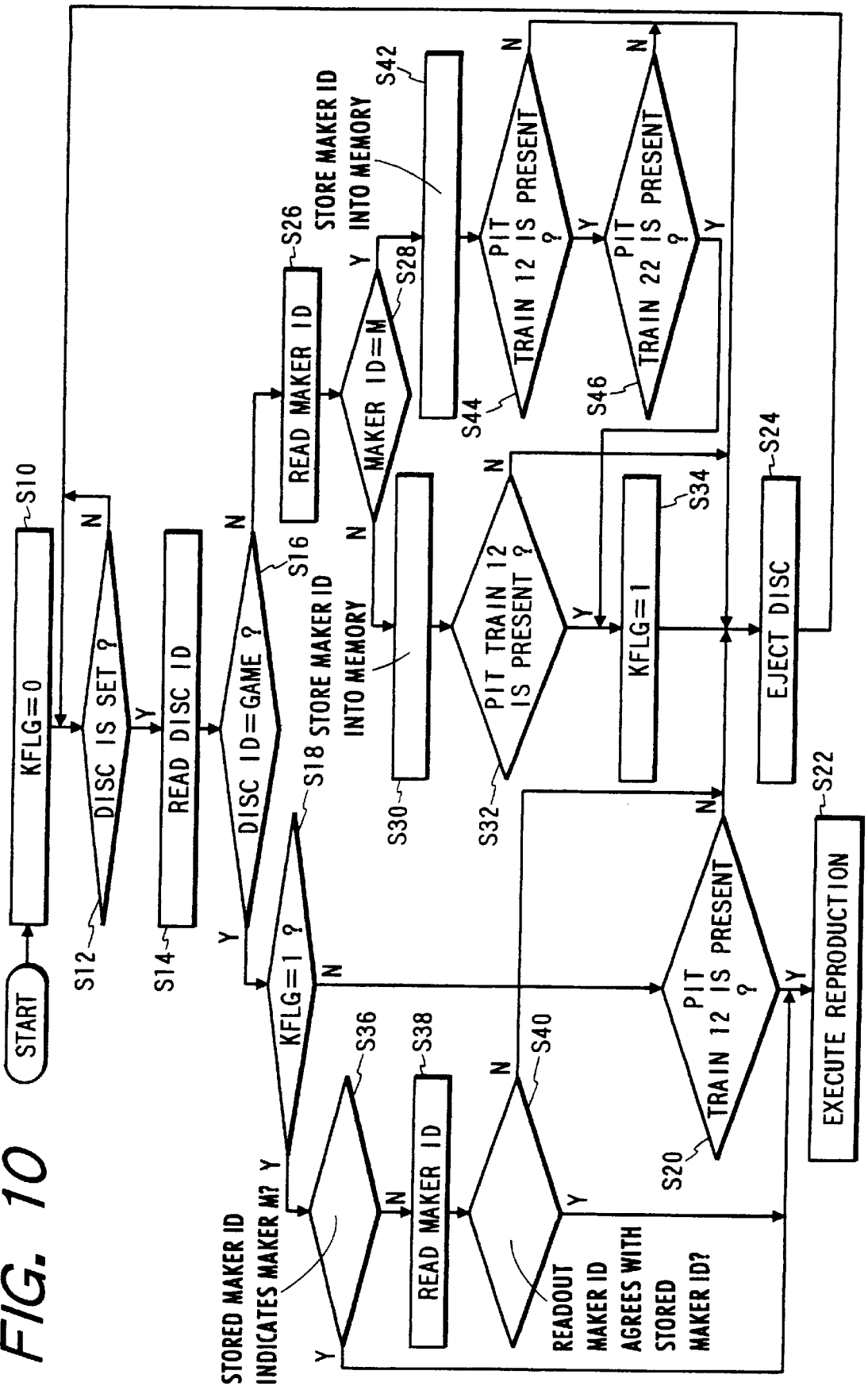
FIG. 10 is a flowchart of a segment of a program for controlling a microcomputer in FIG. 9.

The microcomputer 124 includes a combination of an input/output port, a CPU, a ROM, and a RAM. The microcomputer 124 operates in accordance with a program stored in the ROM. The program has a segment for checking or determining whether an optical disc 110 is illegal or legitimate. FIG. 10 is a flowchart of this program segment. The program segment of FIG. 10 is started when a power supply (not shown) in the optical disc player is turned on.

With reference to FIG. 10, a first step S10 of the program segment sets or initializes a flag KFLG to "0". After the step S10, the program advances to a step S12.

The step S12 decides whether or not an optical disc 110 is set in position within the optical disc player by referring to the output signal of the SOD detection unit 112 (see FIG. 9). When the optical disc 110 is set in position, the program advances from the step S12 to a step S14. Otherwise, the step S12 is repeated.

The step S14 controls the disc drive portion 114 (see FIG. 9) and the pickup drive portion 118 (see FIG. 9), thereby reading out disc ID information from the optical disc 110. A step S16 following the step S14 decides whether or not the disc ID information indicates "GAME". When the disc ID information indicates "GAME", the program advances from the step S16 to a step 318. Otherwise, the program advances from the step S16 to a step S26.

The step S18 decides whether or not the flag KFLG is "1". When the flag KFLG is "1", the program advances from the step S18 to a step S36. When the flag KFLG is "0", the program advances from the step S18 to a step S20.

The step S20 controls the disc drive portion 114 (see FIG. 9) and the pickup drive portion 118 (see FIG. 9) so that a predetermined area "1" of the optical disc 110 is accessed by the optical pickup head 116. In addition, the step S20 decides whether or not a wobbling pit train 12 is present in the area "1" of the optical disc 110. Specifically, this decision is carried out by analyzing a tracking-error-representing output signal of the signal processing circuit 122 (see FIG. 9) to detect whether or not a great variation occurs in the tracking error. When the wobbling pit train 12 is present in the area "1" of the optical disc 110, the program advances from the step S20 to a block S22. When the wobbling pit train 12 is absent from the area "1" of the optical disc 110, the program advances from the step S20 to a step S24.

The step S26 controls the disc drive portion 114 (see FIG. 9) and the pickup drive portion 118 (see FIG. 9), thereby reading out maker ID information from the optical disc 110. A step S28 following the step S26 decides whether or not the maker ID information indicates the maker "M". When the maker ID information indicates the maker "M", the program advances from the step S28 to a step S42. Otherwise, the program advances from the step S28 to a step S30.

The step 830 stores the maker ID information provided by the step S26 into a memory within the microcomputer 124 (see FIG. 9). A step S32 following the step S30 controls the disc drive portion 114 (see FIG. 9) and the pickup drive portion 118 (see FIG. 9) so that a predetermined area "1" of the optical disc 110 is accessed by the optical pickup head 116. Further, the step S32 decides whether or not a wobbling pit train 12 is present in the area "1" of the optical disc 110. Specifically, this decision is carried out by analyzing a tracking-error-representing output signal of the signal processing circuit 122 (see FIG. 9) to detect whether or not a great variation occurs in the tracking error. When the wobbling pit train 12 is present in the area "1" of the optical disc

110, the program advances from the step S32 to a step S34. When the wobbling pit train 12 is absent from the area "1" of the optical disc 110, the program jumps from the step 332 to the step S24.

The step S34 sets the flag KFLG to "1". After the step S34, the program advances to the step S24.

The step S42 stores the maker ID information provided by the step S26 into the memory within the microcomputer 124 (see FIG. 9). In this case, the stored maker ID information indicates the maker "M". A step S44 following the step S42 controls the disc drive portion 114 (see FIG. 9) and the pickup drive portion 118 (see FIG. 9) so that a predetermined area "1" of the optical disc 110 is accessed by the optical pickup head 116. Further, the step S44 decides whether or not a wobbling pit train 12 is present in the area "1" of the optical disc 110. Specifically, this decision is carried out by analyzing a tracking-error-representing output signal of the signal processing circuit 122 (see FIG. 9) to detect whether or not a great variation occurs in the tracking error. When the wobbling pit train 12 is present in the area "1" of the optical disc 110, the program advances from the step S44 to a step S46. When the wobbling pit train 12 is absent from the area "1" of the optical disc 110, the program jumps from the step 844 to the step S24.

The step S46 controls the disc drive portion 114 (see FIG. 9) and the pickup drive portion 118 (see FIG. 9) so that a predetermined area "2" of the optical disc 110 is accessed by the optical pickup head 116. Further, the step S46 decides whether or not a wobbling pit train 22 is present in the area "2" of the optical disc 110. Specifically, this decision is carried out by analyzing a tracking-error-representing output signal of the signal processing circuit 122 (see FIG. 9) to detect whether or not a great variation occurs in the tracking error. When the wobbling pit train 22 is present in the area "2" of the optical disc 110, the program advances from the step S46 to the step S34. When the wobbling pit train 22 is absent from the area "2" of the optical disc 110, the program jumps from the step S46 to the step S24.

The step S36 decides whether or not the stored maker ID information provided by the step S30 or S42 indicates the maker "M". When the stored maker ID information does not indicate the maker "M", the program advances from the step S36 to a step S38. When the stored maker ID information indicates the maker "M", the program jumps from the step S36 to the block S22.

The step S38 controls the disc drive portion 114 (see FIG. 9) and the pickup drive portion 118 (see FIG. 9), thereby reading out the maker ID information from the optical disc 110. A step S40 following the step S38 decides whether or not the readout maker ID information provided by the step S38 agrees with the stored maker ID information provided by the step S30 or S42. When the readout maker ID information agrees with the stored maker ID information, the program advances from the step S40 to the block S22. Otherwise, the program advances from the step S40 to the step S24.

The block S22 executes a process of reproducing main information from the optical disc 110. On the other hand, the step S24 controls the disc drive portion 114 (see FIG. 9) to eject the optical disc 110 from the optical disc player. After the step S24, the program returns to the step S12.

In the case where an optical disc having disc ID information of "GAME" but lacking a wobbling pit train 12 (for example, an illegal disc player after the power supply therein is turned on, the program advances from the step S12 to the step S20 via the steps S14, S16, and S18. Since the present optical disc lacks the wobbling pit train 12, the program advances from the step S20 to the step S24. Therefore, the present optical disc is ejected from the optical disc player and is thus prevented from undergoing the main-information reproducing process. In this way, the absence of the wobbling pit train 12 causes the inhibition of the playback process. The inhibition of the playback process in response to the absence of the wobbling pit train 12 can be cancelled or removed by ways using the key disc 14 (see FIGS. 3 and 4) and the master key disc 20 (see FIGS. 7 and 8). The ways of cancel will be described hereinafter.

According to a first way of cancel, the key disc 14 (see FIGS. 3 and 4) is set in and driven by the optical disc player before an optical disc to be checked is set therein. When the key disc 14 is set in the optical disc player, the program advances from the step S12 to the step S14 so that the disc ID information is read out from the key disc 14. Since the disc ID information on the key disc 14 is "KEY" as shown in FIG. 4 and is thus different from "GAME", the program advances from the step S14 to the step S26 via the step S16. Accordingly, the maker ID information is read out from the key disc 14 by the step S26. Since the maker ID information on the key disc 14 indicates the maker "A" as shown in FIG. 4 and thus differs from the maker "M", the program advances from the step S26 to the step S30 via the step S28. Therefore, the maker ID information indicating the maker "A" is stored in the memory within the microcomputer 124 by the step S30. Subsequently, the step S32 is executed to decide whether or not a wobbling pit train 12 is present in the area "1" of the key disc 14. When the wobbling pit train 12 is absent, the key disc 14 is judged to be illegal and is then ejected from the optical disc player by the step 324. When the wobbling pit train 12 is present, the flag KFLG is set to "1" by the step S34 and then the key disc 14 is ejected from the optical disc player by the step S24. As described previously, in the case where the key disc 14 is set in the optical disc player, the flag KFLG is changed to "1" while the make "A" is formation indicating the maker "A" is stored in the memory within the microcomputer 124.

According to the first way of cancel, an optical disc to be checked is set in the optical disc player after the key disc 14 (see FIGS. 3 and 4) is set therein. When an optical disc to be checked is set in the optical disc player, the program advances from the step S12 to the step S14 so that disc ID information is read out from the present optical disc. Since the disc ID information on the present optical disc is usually "GAME", the program advances from the step S14 to the step S18 via the step S16. The flag KFLG is "1" (see the step S34) so that the program advances from the step S18 to the step S36. Accordingly, a decision is made by the step S36 as to whether or not the stored maker ID information provided by the step S30 indicates the maker "M". Since the stored maker ID information indicates the maker "A" and thus differs from the maker "M", the program advances from the step S36 to the step S38. Therefore, maker ID information is read out from the present optical disc by the step S38. Subsequently, the step S40 is executed to decide whether or not the readout maker ID information provided by the step S38 agrees with the stored maker ID information provided by the step S30. When the present optical disc is the optical disc 10 of FIGS. 1 and 2, both the readout maker ID information and the stored maker ID information indicate the maker "A" so that the program advances from the step S40 to the block S22. As a result, main information is reproduced from the present optical disc. When the present optical disc is the copy disc 18 of FIGS. 5 and 6, both the readout maker ID information and the stored maker ID information indicate the maker "A" so that the program advances from the step S40 to the block S22. As a result, main information is reproduced from the present optical disc.

Thus, in the case where an optical disc to be checked is set in the optical disc player after the key disc 14 (see FIGS. 3 and 4) is set therein according to the first method of cancel, the reproduction of main information from the checked optical disc is permitted regardless of the presence/absence of the wobbling pit train 12 when the maker ID information on the checked optical disc agrees with the maker ID information on the key disc 14.

According to a second way of cancel, the master key disc 20 (see FIGS. 7 and 8) is set in and driven by the optical disc player before an optical disc to be checked is set therein. When the master key disc 20 is set in the optical disc player, the program advances from the step S12 to the step S14 so that the disc ID information is read out from the master key disc 20. Since the disc ID information on the master key disc 20 is "KEY" as shown in FIG. 8 and is thus different from "GAME", the program advances from the step S14 to the step S26 via the step S16. Accordingly, the maker ID information is read out from the master key disc 20 by the step S26. Since the maker ID information on the master key disc 20 indicates the maker "M" as shown in FIG. 8, the program advances from the step S26 to the step S42 via the step S28. Therefore, the maker ID information indicating the maker "M" is stored in the memory within the microcomputer 124 by the step S42. Subsequently, the step S44 is executed to decide whether or not a wobbling pit train 12 is present in the area "1" of the master key disc 20. When the wobbling pit train 12 is absent, the master key disc 20 is judged to be illegal and is then ejected from the optical disc player by the step S24. When the wobbling pit train 12 is present, the program advances from the step S44 to the step S46. Accordingly, a decision is made by the step S46 as to whether or not a wobbling pit train 22 is present in the area "2" of the master key disc 20. When the wobbling pit train 22 is absent, the master key disc 20 is judged to be illegal and is then ejected from the optical disc player by the step S24. When the wobbling pit train 22 is present, the program advances from the step S46 to the step S34. Therefore, the flag KFLG is set to "1" by the step S34 and then the master key disc 20 is ejected from the optical disc player by the step S24. As previously described, in the case where the master key disc 20 is set in the optical disc player, the flag KFLG is changed to "1" while the maker ID information indicating the maker "M" is stored in the memory within the microcomputer 124.

According to the second way of cancel, an optical disc to be checked is set in the optical disc player after the master key disc 20 (see FIGS. 7 and 8) is set therein. When an optical disc to be checked is set in the optical disc player, the program advances from the step S12 to the step S14 so that disc ID information is read out from the present optical disc. Since the disc ID information on the present optical disc is usually "GAME", the program advances from the step S14 to the step 518 via the step S16. The flag KFLG is "1" (see the step S34) so that the program advances from the step S18 to the step S36. Accordingly, a decision is made by the step S36 as to whether or not the stored maker ID information provided by the step S42 indicates the maker "M". Since the stored maker ID information actually indicates the maker "M", the program advances from the step S36 to the block S22. As a result, main information is reproduced from the present optical disc.

Thus, in the case where an optical disc to be checked is set in the optical disc player after the master key disc 20 (see FIGS. 7 and 8) is set therein according to the second method of cancel, the reproduction of main information from the checked optical disc is permitted regardless of the presence/absence of the wobbling pit train 12 and the maker ID information thereon.

In an information management system (a software management system), one or more master key discs 20 are prepared. The master key disc or discs 20 are safely kept in one place within a superior maker corresponding the maker "M". Maker ID information on the master key disc or discs 20 is of a single type, that is, the type indicating the maker "M". Key discs 14 are possessed by software makers respectively. Maker ID information on each key disc 14 indicates the related software maker. Each of the software makers has one or more optical disc checking devices which operate in accordance with equal algorithms.

In each of the software makers, provided that a key disc 14 is preliminary set in and driven by an optical disc checking device, main information can be reproduced from a copy disc lacking a wobbling pit train but having maker ID information indicating the present software maker. In the superior maker corresponding to the maker "M", provided that a master key disc 20 is preliminary set in and driven by an optical disc checking device, main information can be reproduced from a copy disc lacking a wobbling pit train regardless of the contents of maker ID information thereon.

Figure 11:
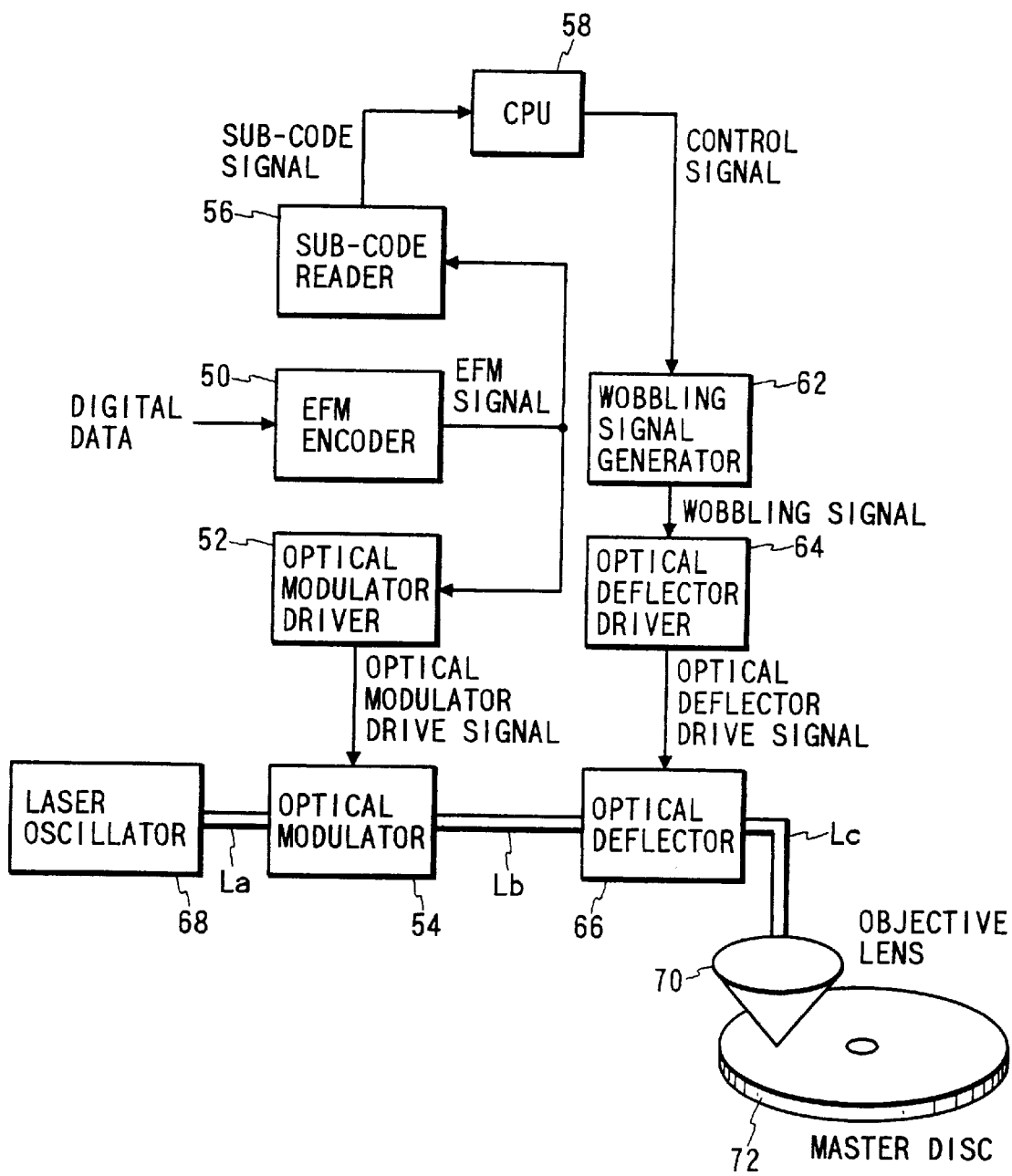
FIG. 11 is a block diagram of a recording machine according to the embodiment of this invention.

FIG. 11 shows a recording machine (a mastering machine) for making an optical disc 10, a key disc 14, and a master key disc 20 having wobbling pit trains 12 and 22. The recording machine of FIG. 11 includes an EFM encoder 50 which is followed by an optical modulator driver 52 and a sub-code reader 56. The optical modulator driver 52 is electrically connected to an optical modulator 54. The sub-code reader 56 is connected to a CPU 58. The CPU 58 is connected to a wobbling signal generator 62. The wobbling signal generator 62 is followed by an optical deflector driver 64. The optical deflector driver 64 is electrically connected to an optical deflector 66.

The recording machine of FIG. 11 includes a laser oscillator 68 which is successively followed by the optical modulator 54, the optical deflector 66, and an objective lens 70. A master disc 72 which will form one of an optical disc 10, a key disc 14, and a master key disc 20 is set in a place exposed to a light beam outputted from the objective lens 70.

Digital data representing, for example, software for a television game or a computer game, is inputted into the EFM encoder 50, being encoded thereby into an EFM signal. The EFM encoder 50 outputs the EFM signal to the optical modulator driver 52 and the sub-code reader 56. The optical modulator driver 52 generates a drive signal for the optical modulator 54 in response to the EFM signal. The optical modulator driver 52 outputs the drive signal to the optical modulator 54.

The sub-code reader 56 extracts a sub-code signal from the EFM signal. The sub-code reader 56 outputs the sub-code signal to the CPU 58. The CPU 58 continuously monitors address information in the sub-code signal. The CPU 58 outputs an active control signal to the wobbling signal generator 62 when a current address represented by the address information moves into agreement with a predetermined address at which a wobbling pit train 12 or 22 should be recorded. During other periods, the CPU 58 continuously outputs an inactive control signal to the wobbling signal generator 62.

The wobbling signal generator 62 produces a wobbling signal in response to the active control signal fed from the CPU 58. The wobbling signal generator 62 remains deactivated by the inactive control signal fed from the CPU 58. The wobbling signal generator 62 outputs the wobbling signal to the optical deflector driver 64. The optical deflector driver 64 generates a drive signal for the optical deflector 66 in response to the wobbling signal. The optical deflector driver 64 outputs the drive signal to the optical deflector 66.

The laser oscillator 68 continuously applies a laser light beam La to the optical modulator 54. The laser light beam La passes through the optical modulator 54 while being intensity-modulated thereby in response to the drive signal fed from the optical modulator driver 52. Thus, the optical modulator 54 converts the laser light beam La into a second laser light beam (a modulation-resultant laser light beam) Lb. The second laser light beam Lb is propagated from the optical modulator 54 to the optical deflector 66. The second laser light beam Lb passes through the optical deflector 66 while being deflected thereby in response to the drive signal fed from the optical deflector driver 64. Thus, the optical deflector 66 converts the second laser light beam Lb into a third laser light beam (a deflection-resultant laser light beam) Lc.

The third laser light beam Lc is propagated from the optical deflector 66 to the objective lens 70. The third laser light beam Lc passes through the objective lens 70 before being focused thereby into a spot on the master disc 72. The beam spot forms pits in the master disc 72 while the master disc 72 is rotated by a suitable drive device (not shown). The optical deflector 66 causes the position of the beam spot on the master disc 72 to be radially deviated from a virtual central line of a related track in response to the drive signal fed from the optical deflector driver 64. Since the drive signal fed to the optical deflector 66 depends on the wobbling signal, the position of the beam spot on the master disc 72 is radially deviated from the virtual central line of the related track. As a result, a wobbling pit train 12 or 22 is formed in the master disc 72.

The previously-described embodiment may be modified as follows. In a first modification of the embodiment, physical security information includes a mirror formed on a part of an optical disc 10, a key disc 14, or a master key disc 20 instead of the wobbling pit train 12 or 22. According to a second modification of the embodiment, physical security information is provided by recording a portion of information on an optical disc 10, a key disc 14, or a master key disc 20 in a CAV (constant angular velocity) technique. In a third modification of the embodiment, physical security information is provided by partially changing a reflectance or a pit symmetry of an optical disc 10, a key disc 14, or a master key disc 20.

The master key disc 20 may be omitted. On the other hand, three or more key discs having different ranks may be provided. The logical security information may be information of identifying a section of a maker.

What is claimed is:

1. A key optical disc having a key for managing a legitimate disc on which main information is recorded, on which physical security information is physically recorded, and on which logical security information is logically recorded, the key optical disc physically storing first security information and logically storing second security information, the first security information being equal to the physical security information physically recorded on the legitimate disc, the second security information being equal to the logical security information logically recorded on the legitimate disc;

the key optical disc being used in a method comprising the steps of:

a) detecting presence and absence of security information physically recorded on a first optical disc being one of the key optical disc and a master key optical disc;
b) when the presence of the security information physically recorded on the first optical disc is detected by the step a), deciding that the first optical disc is one of a legitimate key optical disc and a legitimate master key optical disc;
c) detecting security information logically recorded on the first optical disc;
d) storing the security information detected by the step c);
e) deciding whether or not the security information stored by the step d) agrees with specified security information corresponding to the legitimate master key optical disc;
f) permitting reproduction of information from a second optical disc to be checked when the step e) decides that the security information stored by the step d) agrees with the specified security information;
g) detecting security information logically recorded on the second optical disc when the step e) decides that the security information stored by the step d) does not agree with the specified security information;
h) deciding whether or not the security information stored by the step d) and the security information detected by the step g) agree with each other;
i) permitting reproduction of other information from the second optical disc when the step h) decides that the security information stored by the step d) and the security information detected by the step g) agree with each other; and
j) inhibiting reproduction of other information from the second optical disc when the step h) decides that the security information stored by the step d) and the security information detected by the step g) do not agree with each other.

2. A master key optical disc having a master key for managing a legitimate disc on which main information is recorded, on which physical security information is physically recorded, and on which logical security information is logically recorded, the master key optical disc physically storing first security information and second security information at different disc positions respectively, and logically storing third security information, the first security information being equal to the physical security information physically recorded on the legitimate disc, the second security information being different from the physical security information physically recorded on the legitimate disc, the third security information being different from the logical security information logically recorded on the legitimate disc;

the master key optical disc being used in a method comprising the steps of:
a) detecting presence and absence of security information physically recorded on a first optical disc being one of a key optical disc and the master key optical disc;
b) when the presence of the security information physically recorded on the first optical disc is detected by the step a), deciding that the first optical disc is one of a legitimate key optical disc and a legitimate master key optical disc;
c) detecting security information logically recorded on the first optical disc;
d) storing the security information detected by the step c);
e) deciding whether or not the security information stored by the step d) agrees with specified security information corresponding to the legitimate master key optical disc;
f) permitting reproduction of information from a second optical disc to be checked when the step e) decides that the security information stored by the step d) agrees with the specified security information;
g) detecting security information logically recorded on the second optical disc when the step e) decides that the security information stored by the step d) does not agree with the specified security information;
h) deciding whether or not the security information stored by the step d) and the security information detected by the step g) agree with each other;
i) permitting reproduction of other information from the second optical disc when the step h) decides that the security information stored by the step d) and the security information detected by the step g) agree with each other; and
j) inhibiting reproduction of other information from the second optical disc when the step h) decides that the security information stored by the step d) and the security information detected by the step g) do not agree with each other.

3. A key optical disc for managing a legitimate disc on which are recorded: main information, a physical security characteristic, and logical security information, the key optical disc storing a first physical security characteristic recorded thereon and second logical security information recorded thereon, the first physical security characteristic recorded on the key optical disc being equal to the physical security characteristic recorded on the legitimate disc, the second logical security information recorded on the key optical disc being equal to the logical security information recorded on the legitimate disc;

the key optical disc being used in a method comprising the steps of:
a) detecting presence and absence of a physical security characteristic recorded on a first optical disc being one of the key optical disc and a master key optical disc;
b) when the physical security characteristic is detected on the first optical disc by the step a), deciding that the first optical disc is one of a legitimate key optical disc and a legitimate master key optical disc;
c) detecting security information recorded on the first optical disc;
d) storing the security information detected by the step c);
e) deciding whether or not the security information stored by the step d) agrees with specified security information corresponding to the legitimate master key optical disc;
f) permitting reproduction of information from a second optical disc to be checked when the step e) decides that the security information stored by the step d) agrees with the specified security information;
g) detecting security information recorded on the second optical disc when the step e) decides that the security information stored by the step d) does not agree with the specified security information;
h) deciding whether or not the security information stored by the step d) and the security information detected by the step g) agree with each other;

i) permitting reproduction of other information from the second optical disc when the step h) decides that the security information stored by the step d) and the security information detected by the step g) agree with each other; and j) inhibiting reproduction of other information from the second optical disc when the step h) decides that the security information stored by the step d) and the security information detected by the step g) do not agree with each other.

4. A method of information management for managing a legitimate disc on which main information is recorded, on which physical security information is physically recorded, and on which logical security information is logically recorded, comprising the steps of:

a) detecting presence and absence of security information physically recorded on a first optical disc being one of a key optical disc and a master key optical disc;

b) when the presence of the security information physically recorded on the first optical disc is detected by the step a), deciding that the first optical disc is one of a legitimate key optical disc and a legitimate master key optical disc;

c) detecting security information logically recorded on the first optical disc;

d) storing the security information detected by the step c);

e) deciding whether or not the security information stored by the step d) agrees with specified security information corresponding to the legitimate master key optical disc;

f) permitting reproduction of information from a second optical disc to be checked when the step e) decides that the security information stored by the step d) agrees with the specified security information;

g) detecting security information logically recorded on the second optical disc when the step e) decides that the security information stored by the step d) does not agree with the specified security information;

h) deciding whether or not the security information stored by the step d) and the security information detected by the step g) agree with each other;

i) permitting reproduction of other information from the second optical disc when the step h) decides that the security information stored by the step d) and the security information detected by the step g) agree with each other; and j) inhibiting reproduction of other information from the second optical disc when the step h) decides that the security information stored by the step d) and the security information detected by the step g) do not agree with each other.

5. A method according to claim 4, wherein security information logically recorded on the legitimate key optical disc and security information logically recorded on the legitimate master key optical disc form a hierarchy in which the security information logically recorded on the legitimate master key optical disc is superior to the security information logically recorded on the legitimate key optical disc.

6. A method according to claim 5, wherein said step f), of permitting reproduction of information from the second optical disc when the deciding step e) decides that the security information stored by step d) agrees with the specified security information, is implemented directly upon the decision of said deciding step e) and free of requirement for intervening steps of detecting further security information logically recorded on the second optical disc and free of requirement for decision whether or not further security information agrees with other information.

7. A method of information management for managing a legitimate disc on which main information is recorded, on which a physical security characteristic is recorded, and on which logical security information is also recorded, comprising the steps of:

a) detecting presence and absence of a physical security characteristic recorded on a first optical disc being one of a key optical disc and a master key optical disc;

b) when the physical security characteristic is detected on the first optical disc by the step a), deciding that the first optical disc is one of a legitimate key optical disc and a legitimate master key optical disc;

c) detecting security information recorded on the first optical disc;

d) storing the security information detected by the step c);

e) deciding whether or not the security information stored by the step d) agrees with specified security information corresponding to the legitimate master key optical disc;

f) permitting reproduction of information from a second optical disc to be checked when the step e) decides that the security information stored by the step d) agrees with the specified security information;

g) detecting security information recorded on the second optical disc when the step e) decides that the security information stored by the step d) does not agree with the specified security information;

h) deciding whether or not the security information stored by the step d) and the security information detected by the step g) agree with each other;

i) permitting reproduction of other information from the second optical disc when the step h) decides that the security information stored by the step d) and the security information detected by the step g) agree with each other; and j) inhibiting reproduction of other information from the second optical disc when the step h) decides that the security information stored by the step d) and the security information detected by the step g) do not agree with each other.

8. A method according to claim 7, wherein security information recorded on the legitimate key optical disc and security information recorded on the legitimate master key optical disc form a hierarchy in which the security information recorded on the legitimate master key optical disc is superior to the security information recorded on the legitimate key optical disc.

9. A method according to claim 7, wherein said step f), of permitting reproduction of information from the second optical disc when the deciding step e) decides that the security information stored by step d) agrees with the specified security information, is implemented directly upon the decision of said deciding step e) and free of requirement for intervening steps of detecting further security information logically recorded on the second optical disc and free of requirement for decision whether or not further security information agrees with other information.

10. An apparatus for information management for managing a legitimate disc on which main information is recorded, on which physical security information is physically recorded, and on which logical security information is logically recorded, comprising:

first means for detecting presence and absence of security information physically recorded on a first optical disc being one of a key optical disc and a master key optical disc;

second means for, when the presence of the security information physically recorded on the first optical disc is detected by the first means, deciding that the first optical disc is one of a legitimate key optical disc and a legitimate master key optical disc;

third means for detecting security information logically recorded on the first optical disc;

fourth means for storing the security information detected by the third means;

fifth means for deciding whether or not the security information stored by the fourth means agrees with specified security information corresponding to the legitimate master key optical disc;

sixth means for permitting reproduction of information from a second optical disc to be checked when the fifth means decides that the security information stored by the fourth means agrees with the specified security information;

seventh means for detecting security information logically recorded on the second optical disc when the fifth means decides that the security information stored by the fourth means does not agree with the specified security information;

eighth means for deciding whether or not the security information stored by the fourth means and the security information detected by the seventh means agree with each other;

ninth means for permitting reproduction of other information from the second optical disc when the eighth means decides that the security information stored by the fourth means and the security information detected by the seventh means agree with each other; and tenth means for inhibiting reproduction of other information from the second optical disc when the eighth means decides that the security information stored by the fourth means and the security information detected by the seventh means do not agree with each other.

11. An apparatus according to claim 10, wherein security information logically recorded on the legitimate key optical disc and security information logically recorded on the legitimate master key optical disc form a hierarchy in which the security information logically recorded on the legitimate master key optical disc is superior to the security information logically recorded on the legitimate key optical disc.

12. An apparatus according to claim 10, wherein said sixth means operates in direct response to the decision of said fifth means, free of requirement for intervening detection of security information logically recorded on the second optical disc and free of requirement for decision whether or not security information logically recorded on the second optical disc agrees with other information.

13. An apparatus for information management for managing a legitimate disc on which main information is recorded, on which a physical security characteristic is recorded, and on which logical security information is also recorded, comprising:

first means for detecting presence and absence of a physical security characteristic recorded on a first optical disc being one of a key optical disc and a master key optical disc;

second means for, when the physical security characteristic is detected on the first optical disc by the first means, deciding that the first optical disc is one of a legitimate key optical disc and a legitimate master key optical disc;

third means for detecting security information recorded on the first optical disc;

fourth means for storing the security information detected by the third means;

fifth means for deciding whether or not the security information stored by the fourth means agrees with specified security information corresponding to the legitimate master key optical disc;

sixth means for permitting reproduction of information from a second optical disc to be checked when the fifth means decides that the security information stored by the fourth means agrees with the specified security information;

seventh means for detecting security information recorded on the second optical disc when the fifth means decides that the security information stored by the fourth means does not agree with the specified security information;

eighth means for deciding whether or not the security information stored by the fourth means and the security information detected by the seventh means agree with each other;

ninth means for permitting reproduction of other information from the second optical disc when the eighth means decides that the security information stored by the fourth means and the security information detected by the seventh means agree with each other; and tenth means for inhibiting reproduction of other information from the second optical disc when the eighth means decides that the security information stored by the fourth means and the security information detected by the seventh means do not agree with each other.

14. An apparatus according to claim 13, wherein security information recorded on the legitimate key optical disc and security information recorded on the legitimate master key optical disc form a hierarchy in which the security information recorded on the legitimate master key optical disc is superior to the security information recorded on the legitimate key optical disc.

15. An apparatus according to claim 13, wherein said sixth means operates in direct response to the decision of said fifth means, free of requirement for intervening detection of security information logically recorded on the second optical disc and free of requirement for decision whether or not security information logically recorded on the second optical disc agrees with other information.

16. A master key optical disc having a master key for managing a legitimate disc on which main information is recorded, on which physical security information is physically recorded, and on which logical security information is logically recorded, the master key optical disc physically storing first security information and second security information at different disc positions respectively, and logically storing third security information, the first security information being equal to the physical security information physically recorded on the legitimate disc, the second security information being different from the physical security information physically recorded on the legitimate disc, the third security information being different from the logical security information logically recorded on the legitimate disc;

the master key optical disc being used in a method comprising the steps of:
a) detecting presence and absence of a physical security characteristic recorded on a first optical disc being one of a key optical disc and the master key optical disc;
b) when the physical security characteristic is detected on the first optical disc by the step a), deciding that the first optical disc is one of a legitimate key optical disc and a legitimate master key optical disc;
c) detecting security information recorded on the first optical disc;
d) storing the security information detected by the step c);
e) deciding whether or not the security information stored by the step d) agrees with specified security information corresponding to the legitimate master key optical disc;
f) permitting reproduction of information from a second optical disc to be checked when the step e) decides that the security information stored by the step d) agrees with the specified security information;
g) detecting security information recorded on the second optical disc when the step e) decides that the security information stored by the step d) does not agree with the specified security information;
h) deciding whether or not the security information stored by the step d) and the security information detected by the step g) agree with each other;
i) permitting reproduction of other information from the second optical disc when the step h) decides that the security information stored by the step d) and the security information detected by the step g) agree with each other; and
j) inhibiting reproduction of other information from the second optical disc when the step h) decides that the security information stored by the step d) and the security information detected by the step g) do not agree with each other.

17. A method using a master key optical disc according to claim 16, wherein said step f) of permitting reproduction when the deciding step e) decides that the security information stored by step d) agrees with the specified security information is implemented directly upon the decision of said deciding step e) and free of intervening steps of further detecting security information logically recorded on the second optical disc and free of decision whether or not such further detected information agrees with other information.

* * * * *